(12) United States Patent
Li et al.

(10) Patent No.: US 10,959,819 B2
(45) Date of Patent: Mar. 30, 2021

(54) ORAL IRRIGATOR

(71) Applicants: Jin-Feng Li, Xian Tao (CN); Gang Wang, Li Ling (CN); Qing Zhang, Anqing (CN); Xin-Quan Liu, Si Chuan Province (CN); Xiao-Wen Liu, Yongzhou (CN)

(72) Inventors: Jin-Feng Li, Xian Tao (CN); Gang Wang, Li Ling (CN); Qing Zhang, Anqing (CN); Xin-Quan Liu, Si Chuan Province (CN); Xiao-Wen Liu, Yongzhou (CN)

(73) Assignee: NICEFEEL MEDICAL DEVICE TECHNOLOGY CO., LTD., Guangdong (CN)

( * ) Notice: Subject to any disclaimer, the term of this patent is extended or adjusted under 35 U.S.C. 154(b) by 589 days.

(21) Appl. No.: 15/856,101

(22) Filed: Dec. 28, 2017

(65) Prior Publication Data

US 2019/0201175 A1 Jul. 4, 2019

(51) Int. Cl.
*A61C 15/00* (2006.01)
*A61C 17/032* (2006.01)
*A61C 17/02* (2006.01)
*A61C 1/00* (2006.01)

(52) U.S. Cl.
CPC ........ *A61C 17/032* (2019.05); *A61C 17/0202* (2013.01); *A61C 1/0092* (2013.01)

(58) Field of Classification Search
CPC . A61C 17/032; A61C 17/0202; A61C 1/0092; A61C 17/00; A61C 17/0205; A61H 9/00–0007; A61H 9/0021–0028; A61H 13/00–005; A61H 21/00; A61H 23/04; A61H 2201/5051; F16M 11/041; F16B 2200/10
USPC ........................................ 248/222.11, 222.12
See application file for complete search history.

(56) References Cited

U.S. PATENT DOCUMENTS

2016/0151133 A1\* 6/2016 Luettgen ................. F04B 19/22
433/80

\* cited by examiner

*Primary Examiner* — Jan Christopher L Merene
*Assistant Examiner* — Matthew Standard
(74) *Attorney, Agent, or Firm* — Justin Lampel

(57) ABSTRACT

An oral irrigator contains: a body, a water tank and a detachable jet tip which are both in connection with the body, a power device and a control device Which are both accommodated in the body. The power device is configured to deliver water from the water tank to the detachable jet tip. The power device includes a first outlet defined thereon and configured to discharge the water, a delivery tube connecting with the first outlet, and a first seal element configured to stop water flowing into the body from the power device so that the water discharges out of the first outlet.

14 Claims, 7 Drawing Sheets

ORAL IRRIGATOR

FIELD OF THE INVENTION

The present invention relates to an oral irrigator which is waterproof.

BACKGROUND OF THE INVENTION

A conventional oral irrigator leaks water easily to reduce its service life, and an area of a water tank of the conventional oral irrigator is too small to wash the water tank.

The present invention has arisen to mitigate and/or obviate the afore-described disadvantages.

SUMMARY OF THE INVENTION

The primary aspect of the present invention is to provide an oral irrigator which is waterproof.

To obtain above-mentioned aspect, an oral irrigator provided by the present invention contains: a body, a water tank and a detachable jet tip which are both in connection with the body, a power device and a control device which are both accommodated in the body.

The power device is configured to deliver water from the water tank to the detachable jet tip.

The power device includes a first outlet defined thereon and configured to discharge the water, a delivery tube connecting with the first outlet, and a first seal element configured to stop water flowing into the body from the power device so that the water discharges out of the first outlet.

DETAILED DESCRIPTION OF THE PREFERRED EMBODIMENTS

Figure 1:
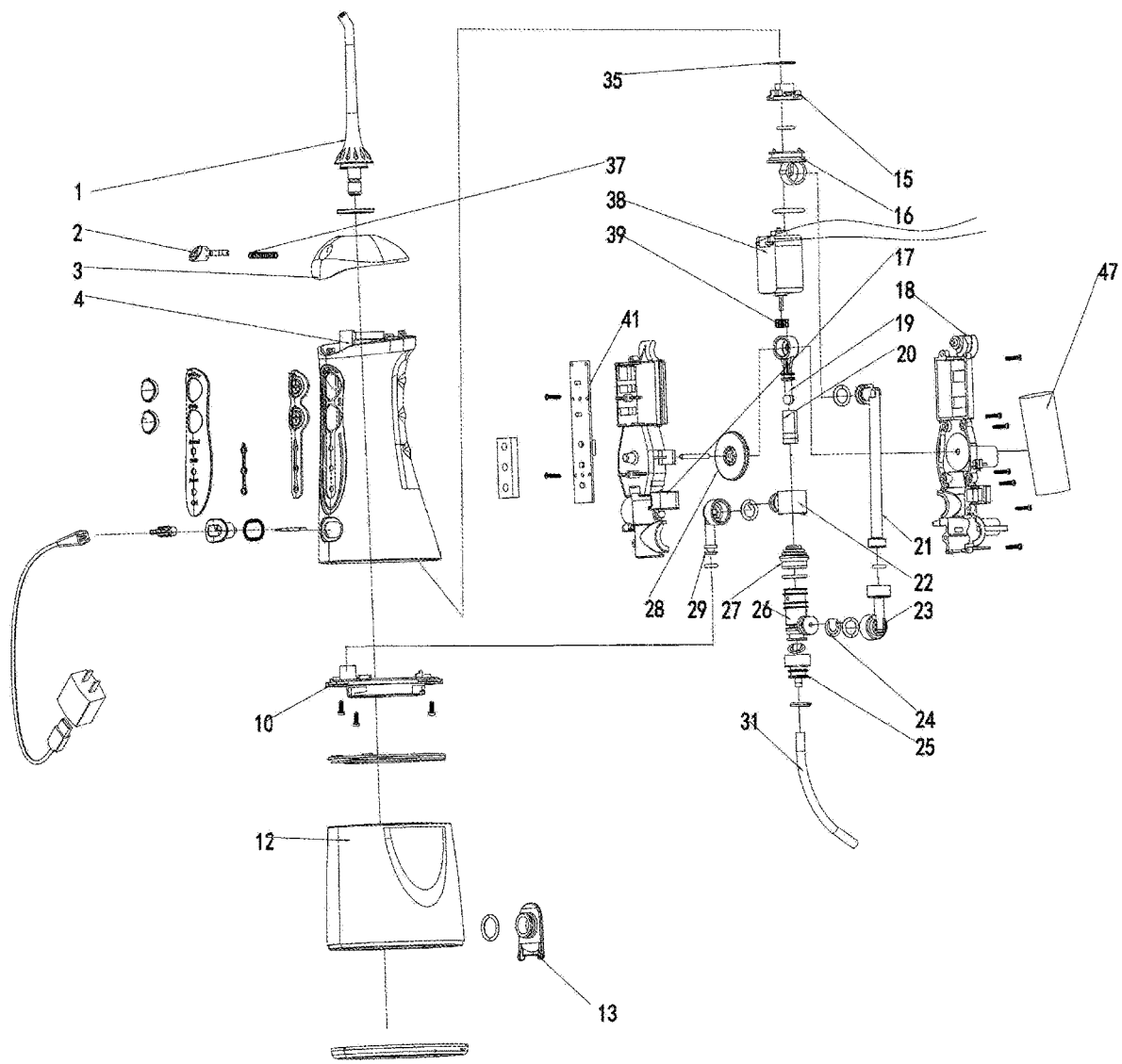
FIG. 1 is a perspective view showing exploded components of an oral irrigator according to a preferred embodiment of the present invention.

With reference to FIG. 1, an oral irrigator according to a preferred embodiment of the present invention comprises: a body 4, a water tank 12 and a detachable jet tip 1 which are both in connection with the body 4, a power device and a control device which are both accommodated in the body 4.

The power device is configured to deliver water from the water tank 12 to the detachable jet tip 1, and the power device includes a first outlet defined thereon and configured to discharge the water, a delivery tube 29 connecting with the first outlet, a first connector 22 connected with the first outlet, and a first seal element 27 configured to stop water flowing into the body 4 from the power device so that the water discharges out of the first outlet. The first seal element 27 is a conically stepped washer, and the control device is printed circuit board assembly (PCBA) 41.

Thereby, the oral irrigator is waterproof so as to avoid water leakage as a piston is failed, thus prolonging service life of the oral irrigator.)

Figure 2:
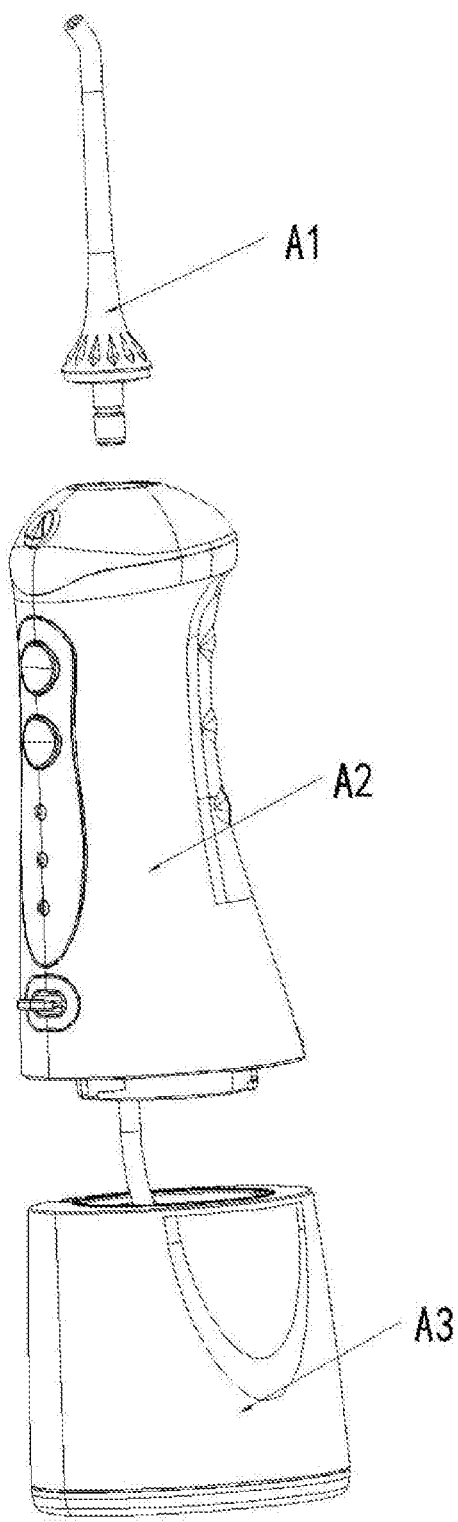
FIG. 2 is another perspective view showing exploded components of the oral irrigator according to the preferred embodiment of the present invention.
Figure 3:
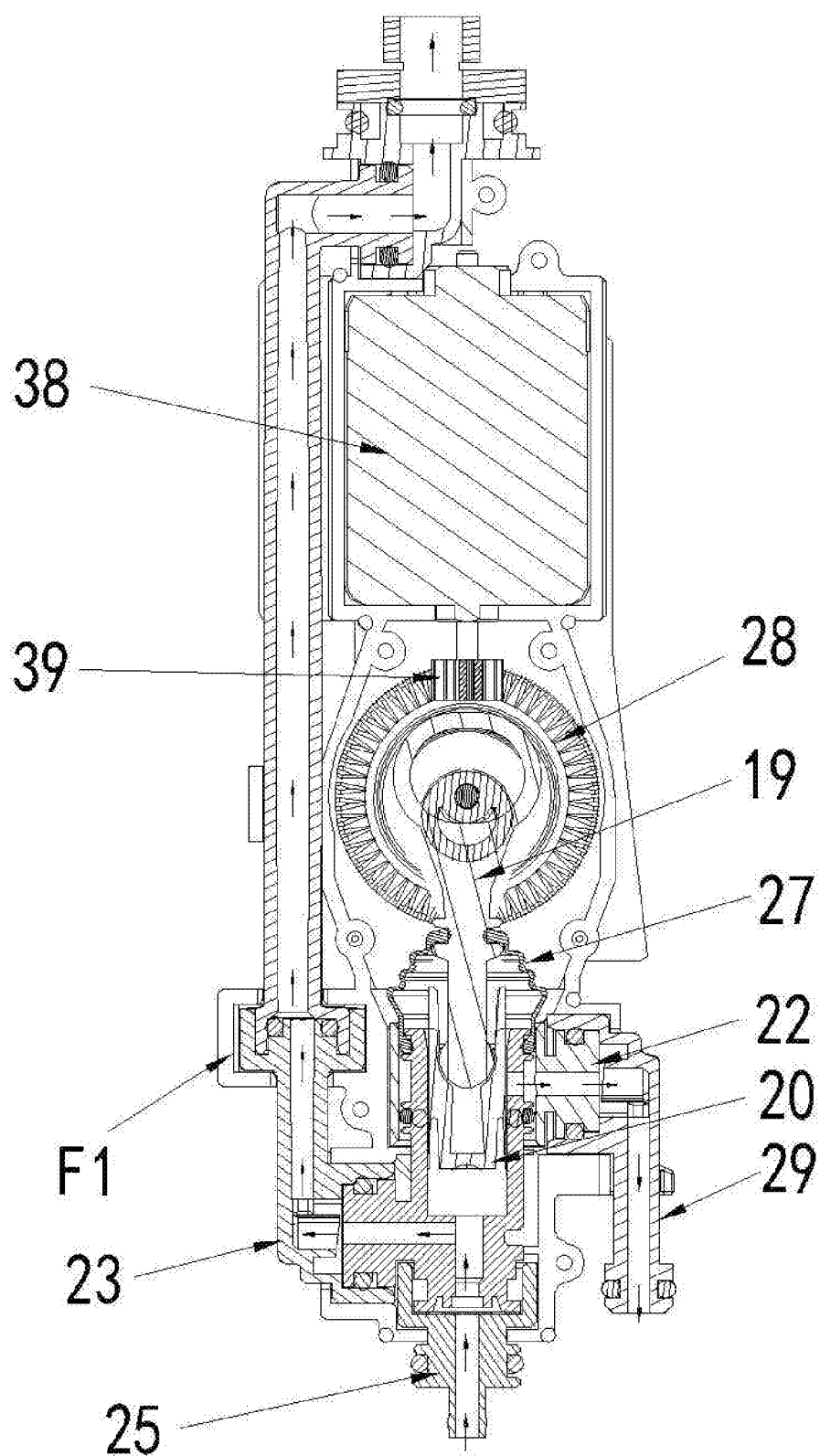
FIG. 3 is a cross sectional view showing the operation of the oral irrigator according to the preferred embodiment of the present invention.
Figure 4:
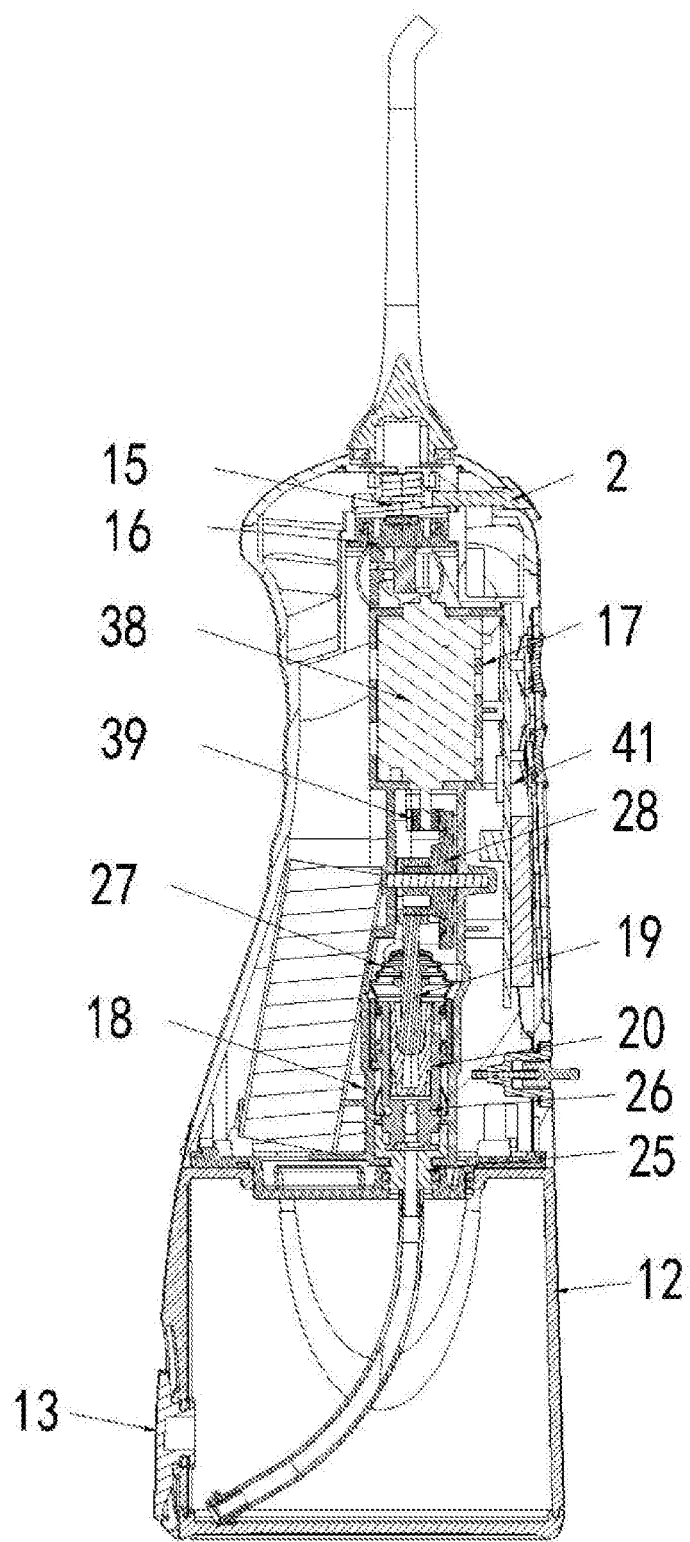
FIG. 4 is a cross sectional view showing the assembly of the oral irrigator according to the preferred embodiment of the present invention.

Referring to FIG. 2, the oral irrigator comprises: a first part A3, a second part A2 and a third part A1, wherein the third part A3 is mounted below the second part A2, the first part A1 is located on a top cap 3 of the second part A2, a hose 31 of the second part A2 extends into the water tank 12 so as to deliver the water to the first part A1 from the water tank 12 via the second part A2 by way of the power device.

Figure 5:
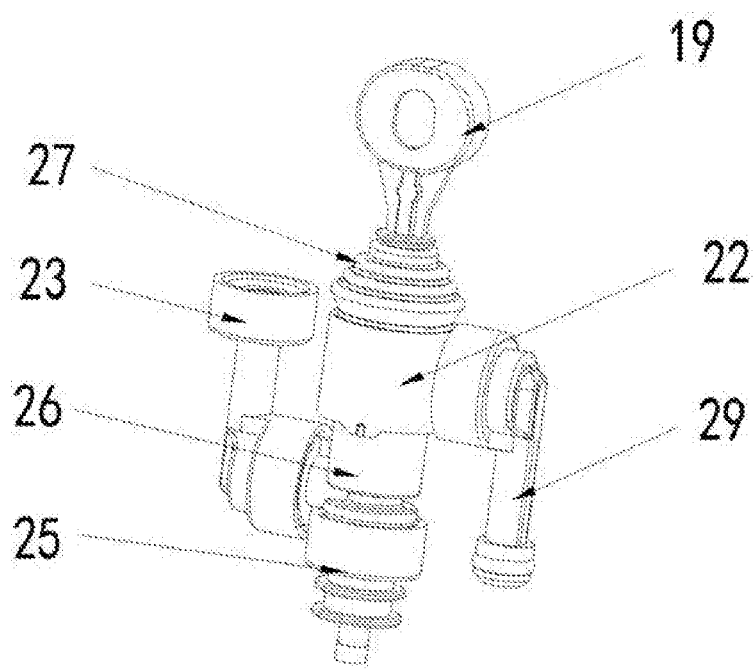
FIG. 5 is a cross sectional view showing the assembly of a part of the oral irrigator according to the preferred embodiment of the present invention.

As shown in FIG. 5, the power device includes a motor 38, a drive gear 39, a reduction gear 28, a pump 26, a correct on rod 19, and the piston 20. The drive gear 39 meshes with the motor 38, the reduction gear 28 meshes with a first end of the connection rod 19, and a second end of the connection rod 19 couples with the piston 20, wherein the piston 20 is movably housed in the pump 26 and is driven by the connection rod 19 so as to move upward and downward relative to the pump 36, a first end of the first seal element 27 is fitted on the connection rod 19, and a second end of the first seal element 27 is connected on the pump 26.

As shown in FIGS. 1, 3-4, and 8, the body 4 accommodates the PCBA 41, the motor 38, the drive gear 39, the reduction gear 28, the connection rod 19, the piston 20, the first seal element 27, the pump 26, the first connector 22, a second connector 25, a third connector 23, the delivery tube 29, a first support 17, and a second support 18, wherein the PCBA 41 is disposed on the first support 17, and a battery 47 is mounted on the second support 18.

After the motor 38 drives the drive gear 39 to decelerate, the drive gear 39 actuates the connection rod 19 to reciprocatingly move backward and forward, the piston 20 moves reciprocatingly with the connection rod 19, hence air in the pump 26 produces negative pressure, the water flows into the pump 26 from the water tank 12 via the second connector 25. Since two valves 24 are fixed among the second connector 25, the third connector 23, and the pump 26 respectively, when the piston 20 moves forward, one valve 24 between the pump 26 and the second connector 25 closes and the other valve 24 between the third connector 23 and the pump 26 opens so that the water flows into a fitting tube 21 via the third connector 23 and further discharges out of the detachable jet tip 1. Two first O rings are defined among the third connector 23, the pump 26, and the fitting tube 21 respectively, wherein an engagement structure F1 is configured to fix the fitting tube 21 and the third connector 23, and a second O ring is defined between the second connector 25 and the third connector 23. The pump 26 has an opening defined over a travel of the piston 20, the first end of the first seal element 27 is fitted on the connection rod 19, and the second end of the first seal element 27 is connected on the pump 26. Preferably, the first seal element 27 is the conically stepped washer, and the first connector 22 is fitted with a third O ring between the first connector 22 and the delivery tube 29. When the piston 20 is failed, the water flows into the first seal element 27. When the piston 20 moves reciprocatingly, the water flows out of the body 4 or flows into the water tank 12 via the opening of the pump 26, the first connector 22, the delivery tube 29, and a second outlet 48 on a bottom cap 10. Preferably, a fourth O ring is defined between the body 4 and the bottom cap 10.

The water tank 12 has an inlet formed on a peripheral side thereof and has a lid 13 on which a fifth O ring is fitted, wherein the lid 12 is removable from the water tank 12 so as to feed the water into the water tank 12 easily.

Figure 6:
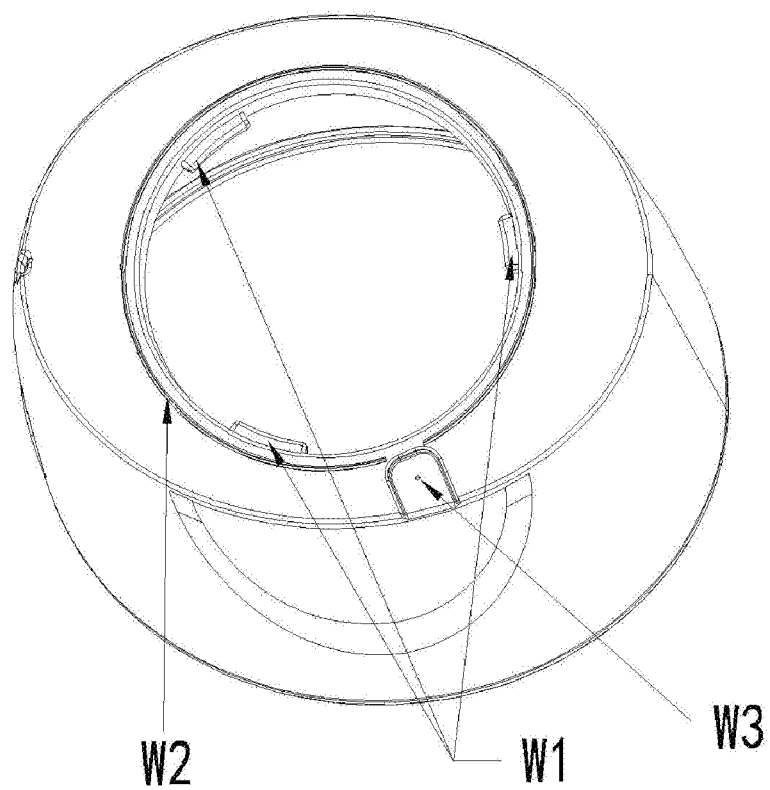
FIG. 6 is a cross sectional view showing the assembly of another part of the oral irrigator according to the preferred embodiment of the present invention.
Figure 7:
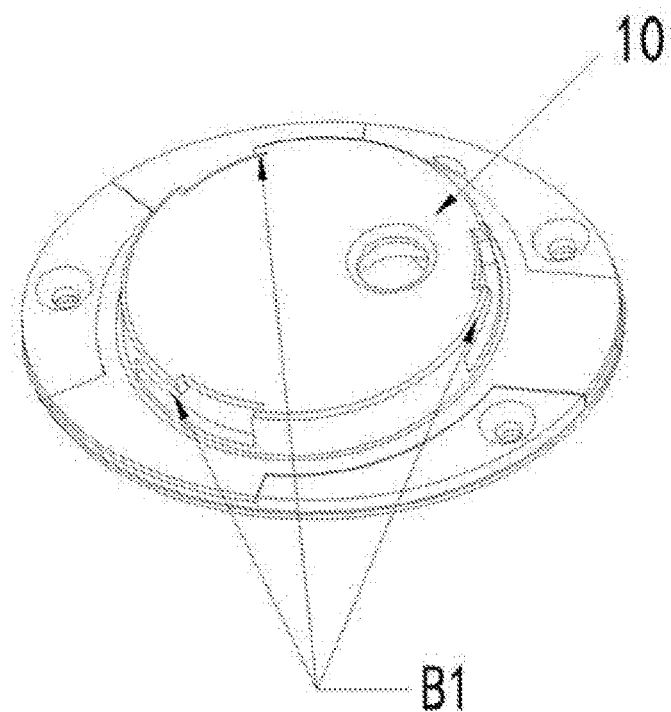
FIG. 7 is a cross sectional view showing the assembly of another part of the oral irrigator according to the preferred embodiment of the present invention.

With reference to FIGS. 6 and 7, the water tank 12 is rotatably retained on the body 4, and the third part A3 is secured on a bottom of the second part A2, wherein the water tank 12 has a mouth formed on a top of the water tank 12 and has three retaining protrusions W1 separately arranged around a rim of the mouth of the water tank 12. The bottom cap 10 has a fixing portion arranged on a bottom thereof and matching with the mouth of the water tank 12, wherein the fixing portion of the bottom cap 10 has three recesses B1 configured to retain with the three retaining protrusions W1 of the mouth of the water tank 12. The water tank 12 further has a surround rib W2 arranged around the mouth of the water tank 12, wherein the water tank 12 has an air bore W3 configured to flow the air. Thereby, the water tank 12 is washed easily via the mouth thereof. Preferably, a sixth O ring B2 is configured to seal the top of the water tank 12 tightly; wherein an area of the mouth of the water tank 12 is over ½ of the top of the water tank 12.

In another embodiment, the water tank 12 has a locking groove defined around the mouth thereof, and the bottom cap 10 has a fasten projection arranged on the fixing portion thereof so as to retain with the locking groove of the mouth of the water tank 12.

Figure 8:
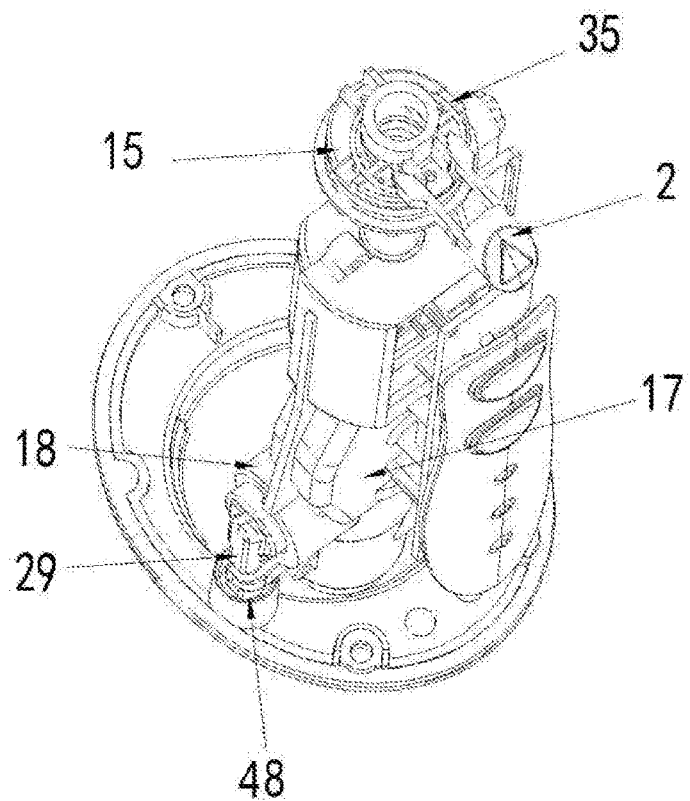
FIG. 8 is a cross sectional view showing the assembly of another part of the oral irrigator according to the preferred embodiment of the present invention.
Figure 9:
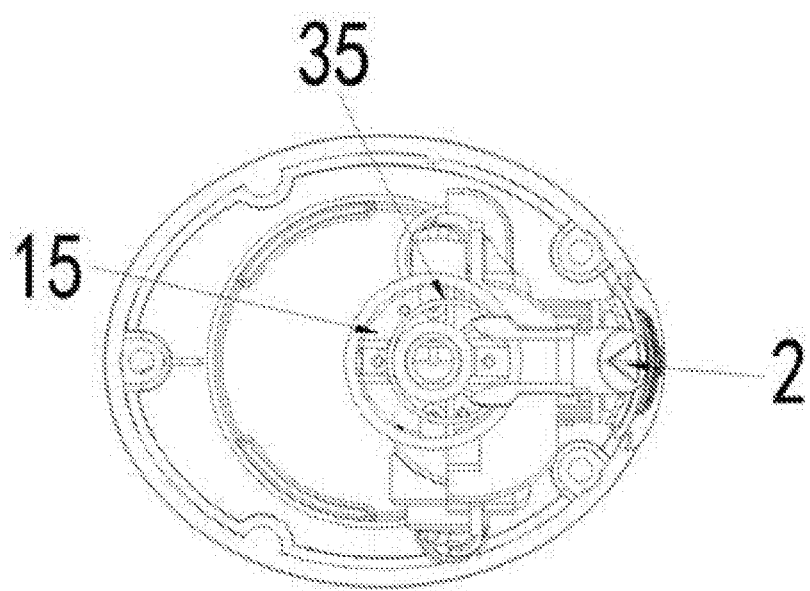
FIG. 9 is a cross sectional view showing the assembly of another part of the oral irrigator according to the preferred embodiment of the present invention.

Referring to FIGS. 8 and 9, the detachable jet tip 1 is fixed on the body 4 by way of an affix loop 35. As shown in FIG. 5, the fitting tube 21 has a holder 16 mounted on a top thereof, the detachable jet tip 1 has a positioning loop secured on a distal end thereof, the holder 16 has a fastener 15 disposed thereon, and the affix loop 35 is fixed on the fastener 15. A button 2 is accommodated on the top cap 3 and has a hook formed on a distal end thereof and fitted with a returning spring 37. As the button 2 is pushed, the hook of the button 2 pushes the affix loop 35 to deform increasingly, and the positioning loop is released so as to remove the detachable jet tip 1 from the body 4. A seventh O ring is defined between the holder 16 and the fastener 15.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. An oral irrigator comprising: a body, a water tank and a detachable jet tip which are both in connection with the body, a power device and a control device which are both accommodated in the body; the power device is configured to deliver water from the water tank to the detachable jet tip; wherein the power device includes a first outlet defined thereon and configured to discharge the water, a delivery tube connecting with the first outlet, and a first seal element configured to stop water flowing into the body from the power device so that the water discharges out of the first outlet;

wherein the first seal element is a conically stepped washer having multiple diameters; and wherein the water tank has a mouth formed on a top of the water tank and has at least one retaining protrusion separately arranged around a rim of the mouth of the water tank, a bottom cap has a fixing portion arranged on a bottom thereof and matching with the mouth of the water tank, wherein the fixing portion of the bottom cap has at least one recess configured to retain with the at least one retaining protrusion of the mouth of the water tank.

2. The oral irrigator as claimed in claim 1 wherein a sixth O ring is secured to the top of the water tank at the mouth of the water tank.

3. The oral irrigator as claimed in claim 2, wherein an area of the mouth of the water tank is over ½ of the top of the water tank.

4. The oral irrigator as claimed in claim 1, wherein an area of the mouth of the water tank is over ½ of the top of the water tank.

5. The oral irrigator as claimed in claim 3, wherein the water tank has an inlet formed on a peripheral side thereof and has a lid on which a fifth O ring is fitted.

6. The oral irrigator as claimed in claim 4, wherein the water tank has an inlet formed on a peripheral side thereof and has a lid on which a fifth O ring is fitted.

7. The oral irrigator as claimed in claim 1, wherein a fitting tube has a holder mounted on a top thereof, the detachable jet tip has a positioning loop secured on a distal end thereof, the holder has a fastener disposed thereon, and the affix loop is fixed on the fastener, a button is accommodated on a top cap, wherein as the button is pushed, the button pushes an affix loop to deform increasingly, and the positioning loop is released so as to remove the detachable jet tip from the body, a seventh O ring is defined between the holder and the fastener.

8. The oral irrigator as claimed in claim 1, wherein a fitting tube has a holder mounted on a top thereof; the detachable jet tip has a positioning loop secured on a distal end thereof, the holder has a fastener disposed thereon, and the affix loop is fixed on the fastener, a button is accommodated on a top cap, wherein as the button is pushed, the button pushes an affix loop to deform increasingly, and the positioning loop is released so as to remove the detachable jet tip from the body, a seventh O ring is defined between the holder and the fastener.

9. The oral irrigator as claimed in claim 5, wherein a button has a hook formed on a distal end thereof and fitted with a returning spring.

10. The oral irrigator as claimed in claim 6, wherein a button has a hook formed on a distal end thereof and fitted with a returning spring.

11. An oral irrigator comprising:

a body, a water tank and a detachable jet tip which are both in connection with the body, a power device and a control device which are both accommodated in the body; the power device is configured to deliver water from the water tank to the detachable jet tip; wherein the power device includes a first outlet defined thereon and configured to discharge the water, a delivery tube connecting with the first outlet, and a first seal element configured to stop water flowing into the body from the power device so that the water discharges out of the first outlet;

wherein the body also has a bottom cap fixed on a bottom thereof and connecting with the water tank; and wherein the water tank has a mouth formed on a top of the water tank and has at least one retaining protrusion separately arranged around a rim of the mouth of the water tank, the bottom cap has a fixing portion arranged on a bottom thereof and matching with the mouth of the water tank, wherein the fixing portion of the bottom cap has at least one recess configured to retain with the at least one retaining protrusion of the mouth of the water tank.

12. An oral irrigator comprising:

a body, a water tank and a detachable jet tip which are both in connection with the body, a power device and a control device which are both accommodated in the body; the power device is configured to deliver water from the water tank to the detachable jet tip; wherein the power device includes a first outlet defined thereon and configured to discharge the water, a delivery tube connecting with the first outlet, and a first seal element configured to stop water flowing into the body from the power device so that the water discharges out of the first outlet;

wherein the power device includes a motor, a drive gear, a reduction gear, a pump, a connection rod, and a piston; the drive gear meshes with the motor, the reduction gear meshes with a first end of the connection rod, and a second end of the connection rod couples with the piston, wherein the piston is movably housed in the pump and is driven by the connection rod so as to move upward and downward relative to the pump, a first end of the first seal element is fitted on the connection rod, and a second end of the first seal element is connected to the pump;

wherein the body also has a bottom cap fixed on a bottom thereof and connecting with the water tank; and wherein the water tank has a mouth formed on a top of the water tank and has at least one retaining protrusion separately arranged around a rim of the mouth of the water tank, the bottom cap has a fixing portion arranged on a bottom thereof and matching with the mouth of the water tank, wherein the fixing portion of the bottom cap has at least one recess configured to retain with the at least one retaining protrusion of the mouth of the water tank.

13. An oral irrigator comprising:

a body, a water tank and a detachable jet tip which are both in connection with the body, a power device and a control device which are both accommodated in the body; the power device is configured to deliver water from the water tank to the detachable jet tip; wherein the power device includes a first outlet defined thereon and configured to discharge the water, a delivery tube connecting with the first outlet, and a first seal element configured to stop water flowing into the body from the power device so that the water discharges out of the first outlet;

wherein the body also has a bottom cap fixed on a bottom thereof and connecting with the water tank; and wherein a fitting tube has a holder mounted on a top thereof, the detachable jet tip has a positioning loop secured on a distal end thereof, the holder has a fastener disposed thereon, and the affix loop is fixed on the fastener, a button is accommodated on a top cap, wherein as the button is pushed, the button pushes an affix loop to deform increasingly, and the positioning loop is released so as to remove the detachable jet tip from the body, a seventh O ring is defined between the holder and the fastener.

14. An oral irrigator comprising:

a body, a water tank and a detachable jet tip which are both in connection with the body, a power device and a control device which are both accommodated in the body; the power device is configured to deliver water from the water tank to the detachable jet tip; wherein the power device includes a first outlet defined thereon and configured to discharge the water, a delivery tube connecting with the first outlet, and a first seal element configured to stop water flowing into the body from the power device so that the water discharges out of the first outlet;

wherein the power device includes a motor, a drive gear, a reduction gear, a pump, a connection rod, and a piston; the drive gear meshes with the motor, the reduction gear meshes with a first end of the connection rod, and a second end of the connection rod couples with the piston, wherein the piston is movably housed in the pump and is driven by the connection rod so as to move upward and downward relative to the pump, a first end of the first seal element is fitted on the connection rod, and a second end of the first seal element is connected to the pump;

wherein the body also has a bottom cap fixed on a bottom thereof and connecting with the water tank; and a fitting tube has a holder mounted on a top thereof; the detachable jet tip has a positioning loop secured on a distal end thereof, the holder has a fastener disposed thereon, and the affix loop is fixed on the fastener, a button is accommodated on a top cap, wherein as the button is pushed, the button pushes an affix loop to deform increasingly, and the positioning loop is released so as to remove the detachable jet tip from the body, a seventh O ring is defined between the holder and the fastener.

* * * * *